April 14, 1970  E. S. BUZZELLI  3,506,491
SOLID ELECTROLYTE BATTERY HAVING LITHIUM OR LITHIUM ALLOY ANODE
Filed May 8, 1968
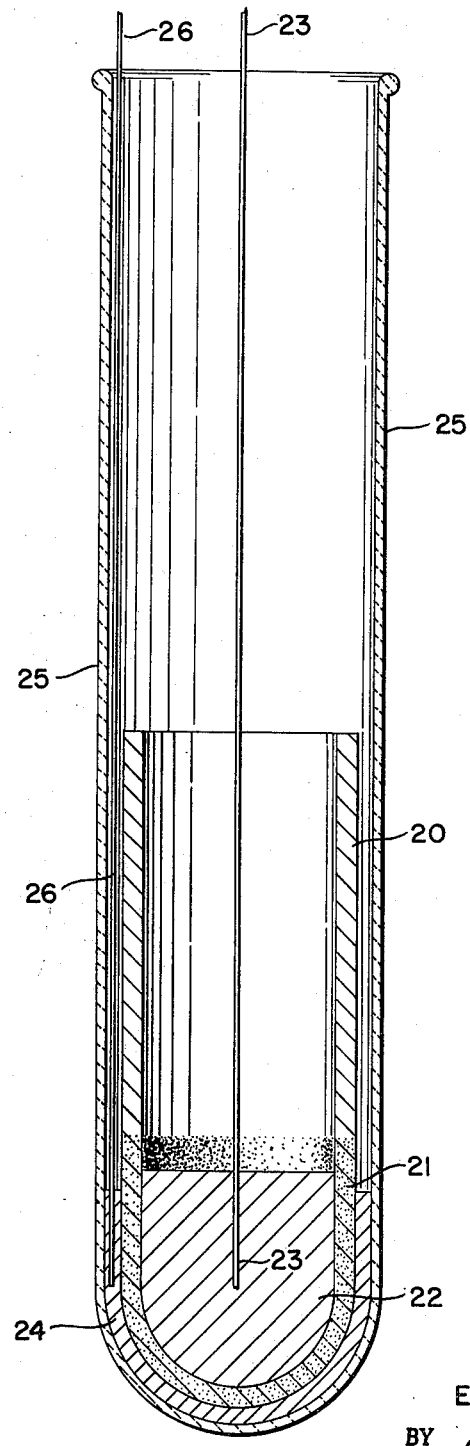
INVENTOR.
EDWARD S. BUZZELLI
BY *Leland L. Chapman*
ATTORNEY

United States Patent Office 3,506,491
Patented Apr. 14, 1970

---

3,506,491
SOLID ELECTROLYTE BATTERY HAVING LITHIUM OR LITHIUM ALLOY ANODE
Edward S. Buzzelli, Solon, Ohio, assignor to The Standard Oil Company, Cleveland, Ohio, a corporation of Ohio
Filed May 8, 1968, Ser. No. 727,551
Int. Cl. H01m 43/06, 43/00, 11/00
U.S. Cl. 136—6                                                    5 Claims

ABSTRACT OF THE DISCLOSURE

A secondary electrical energy storage battery consisting of a lithium or a lithium alloy anode; a metal cathode such as antimony, bismuth, or tellurium; and a solid lithium sulfate electrolyte. This battery is operable above the temperature at which lithium sulfate undergoes a transition from a non-conductor to a conductor, and up to its melting point of 860° C. This battery can also be operated above the melting point of the electrolyte, but the advantages of the solid state electrolyte will not inhere. The capacity of this solid electrolyte battery is in excess of 100 watt-hours per pound.

---

This invention relates to a secondary or a rechargeable electrical energy storage system which is characterized by a solid state electrolyte. More specifically, the electrical energy storage system comprises lithium sulfate electrolyte, a lithium or a lithium alloy anode, and a metal cathode which takes up lithium ions at a voltage which is more positive with respect to lithium. Examples of such metals are antimony, bismuth, and tellurium.

With the advent of the motor vehicle pollution age, a great deal of effort has been dedicated to development of non-polluting systems for propelling vehicles. One of such systems is the subject of this disclosure, although not limited nor restricted in application to vehicle propulsion.

Generally speaking, energy can be stored electrostatically, as in a capacitor unit, or chemically, as in an electrical energy storage device or battery. Both of such means of energy storage, however, are unsuitable for continuous commercial use involving a constant electrical energy drain in that the former, while permitting a quick charge and discharge, suffers from an insufficient electrical storage capacity; while the latter, although much superior with respect to the electrical storage capacity, because of its high power delivery and slow discharge, suffers by virtue of its protracted charging rate. An ideal electrical energy storage device, therefore, combines the quick charge characteristic of the capacitor with the slow discharge and high electrical energy storage capacity of the battery.

The device of the present invention combines the enviable characteristics of a relatively quick charge, i.e., in the range of about half an hour to two hours; a relatively high electrical storage capacity, i.e., on the order of 100 watt-hours per pound; and a solid state electrolyte.

The solid state electrolyte must satisfy three main criteria. First, the material must conduct electricity primarily by ions rather than by electrons. Conduction by electrons lowers the voltage of a galvanic cell below that predicted from thermodynamic calculations. Secondly, the solid electrolyte must be fairly inert to the materials in a cell, especially if any of such materials should happen to be in a liquid state at the operating temperature. A reactive layer would interfere with the operation of the electrochemical cell and excessive corrosion would severely limit the life of the cell and thereby decrease its utility substantially. Thirdly, the solid electrolyte must not be porous since penetration by a liquid electrode would short out the circuit.

A solid state electrolyte battery has a number of important advantages. Since the electrolyte remains solid at the operating temperature, no leakage or sealing problems are encountered. Although seemingly superficial, the sealing problem can be a major obstacle. Sealing of batteries utilizing corrosive molten alkali salt electrolytes has been a major problem, which as yet has not been completely solved. With a solid electrolyte, the interelectrode distance can be reduced to a minimum, thus reducing the internal resistance and size of the battery. Since the solid electrolyte is interposed between opposing electrodes, the necessity for an electrode spacer is obviated, thus disposing of another problem which can be a source of considerable intrigue, as those skilled in the art recognize. Being in the solid state, the electrolyte is relatively non-corrosive, thus insuring lasting structural integrity of the related components.

The solid state electrolyte in the herein described electrical energy storage system is lithium sulfate. The particular function of lithium sulfate is made possible by its unique property of ionizing below its melting point and becoming electrically conducting. This transition occurs at about 575° C. and is accompanied by a crystal change from monoclinic to cubic. The result of the crystal phase change is the precipitation of lithium ions which facilitate ionic conductivity. Since lithium ions in the crystal structure of lithium sulfate are electrical conductors, the electrical resistance of the monoclinic lithium sulfate declines as the crystal phase change shifts to the cubic form. The electrical resistance of lithium sulfate declines logarithmically with increase in temperature and at 575° C., there is a four to five order of magnitude drop over a small temperature range of about 50° C.

Prior to its use as an electrolyte, lithium sulfate must be dried to remove moisture. A technique which is effective in dehydrating lithium sulfate involves melting the hydrated lithium sulfate in an evaporating dish and cooling it to room temperature. This simple operation produces a dry solid lithium sulfate that does not readily pick up water from the air. For example, a sample of lithium sulfate, dehydrated in the manner described above, was found to contain 2 percent of water after having been left exposed to air for two weeks.

Ovshinsky U.S. Patents 3,201,736 and 3,271,584 disclose a scheme of depositing lithium sulfate upon a matrix of a higher melting material for the purpose of maintaining the electrolyte, as a whole, in the solid state. In this respect, lithium sulfate should present a continuous phase in order to promote conduction. As the solid electrolyte, consisting of lithium sulfate deposited on a matrix of a higher melting material, is heated above the melting point of lithium sulfate, the molten lithium sulfate forms small pools or rivulets within the matrix so that the electrolyte structure as a whole remains a solid mass with pools or rivulets of molten lithium sulfate contained therein for conducting the current flow. The matrix material, as disclosed by the Ovshinsky patents, is an inert material of a higher melting point than lithium sulfate. Examples of such matrix materials are lithium ceramic frit, other lithium compounds, electrical insulators, etc. These materials should not react with lithium sulfate to adversely affect the required conductivity nor to produce reaction products having undesirable properties.

The electrolyte of the herein described invention may also comprise a mixture of lithium sulfate and an alkali halide salt or salts such as lithium, potassium, cesium, sodium, and rubidium chlorides and bromides. The composition of the mixed salt electrolyte may vary from 10 to 95 mole percent lithium sulfate. In this composition range, the mixed salt electrolyte conducts in what appears to be a solid phase at temperatures as low as about 400° C.

Although the advantages of the solid state electrolyte will not inhere, lithium sulfate can be utilized as an electrolyte in the molten state.

The anode consists of lithium or a lithium alloy such as aluminum-lithium, indium-lithium, tin-lithium, lead-lithium, silver-lithium, copper-lithium, etc. Ternary lithium alloys can also be used. The preferred anode is the highly reversible aluminum-lithium electrode. The lithium or lithium alloy anode can function in solid or liquid form, depending on the temperature at which the system is operated. When the temperature is above the melting point of the anode, the solid state electrolyte can be utilized to contain the liquid anode. Handling of the lithium alloy anode must be conducted under an inert atmosphere to inhibit oxidation.

The aluminum-lithium anode can be manufactured by combining lithium with aluminum and thus producing a preformed alloy of aluminum and lithium, or, alternatively, electrochemically, by charging a substantially pure aluminum bar in an electrolyte containing lithium ions to the extent of about one amp-hour per gram of aluminum, whereby lithium is diffused into the aluminum bar.

The solid aluminum-lithium alloy anode comprises aluminum and incidental impurities in amounts of from about 70 to 95 weight percent based on total composition, and from about 5 to 30 weight percent lithium. The lithium composition is critical. If the lithium composition is below 5 percent, the capacity of the anode is too low for practical purposes. When the lithium concentration exceeds about 30 percent, the discharge is not flat, but gradient downward. Incidental impurities such as for example copper, magnesium, manganese, indium, and iron may be present in amount of less than 10 weight percent. An anode consisting entirely of lithium can also be utilized, however, because of its low melting point, i.e., 186° C., it will be liquid at the operating temperature and its discharge will be gradient downward.

The aluminum-lithium electrode is capable of storing lithium metal from the electrolyte without forming an extensive liquid. Hence, at an operating temperature below its melting point, the electrode remains solid and is capable of diffusing the lithium metal from electrolyte through its structure. It has been found that on charging the cell comprising the aluminum-lithium electrode, the electrode expands, whereby the lithium metal from electrolyte enters the electrode structure. On discharge, the lithium metal leaves the electrode structure, resulting in its contraction. As is evident, the electrode structure must be able to withstand the stresses of expansion and contraction and for this reason, the aluminum-lithium electrode is preconditioned prior to use.

The preconditioning takes the form of slow charge and slow discharge of the electrode. This slow preconditioning results in an electrode of substantially uniform aluminum-lithium distribution which facilitates take-up and release of the lithium metal upon subsequent fast charge and fast discharge of the electrode. If the initial charge and discharge preconditioning cycles are carried out too rapidly, local regions of liquid are built up resulting in pitting of the electrode. This pitting of the electrode is deleterious in that it promotes cracking and general deterioration of the electrode. Evidence of pitting is visible in the form of lithium agglomeration. Aluminum-lithium electrode cycled by slow charge and discharge shows a fine uniform distribution of the lithium metal in the aluminum. The aluminum-lithium anode-alkali halide molten salt system is more fully described in U.S. patent application Ser. No. 518,473 filed Jan. 3, 1966, now U.S. Patent No. 3,445,288.

The aluminum-lithium electrode is characterized as a constant potential electrode. This means that when aluminum-lithium electrode is charged to a potential which must of necessity be below the decomposition potential of the particular electrolyte in the system, the discharge should be at a constant voltage until the very end when the system becomes fully depleted. In actual practice, however, it has been found that the aluminum-lithium electrode does not discharge at a constant potential. The potential drop of the electrode is a gradient downwardly. This problem has been solved by removing the surface film from the electrode in an inert atmosphere and maintainnig the electrode in an inert atmosphere or submerged in an inert hydrocarbon until it is ready for use. Removal of surface film as described, will result in an aluminum-lithium electrode which is trully a constant potential electrode. The procedure for removing the surface film from an aluminum-lithium electrode is more fully described in U.S. patent application Ser. No. 550,239 filed on May 16, 1966.

During advancement studies of the aluminum-lithium electrode, it was observed that dendrites gradually developed on the electrode during charge-discharge cycling. Dendritic growth proceeded outwardly from the face of the aluminum-lithium electrode and towards the opposing cathode. When dendritic growth was allowed to continue to grow, the growth formed a bridge between electrodes resulting in the short-circuiting of the electrical storage system. This problem has now been solved by circumscribing the aluminum-lithium electrode with a mechanical screen. This screen is from about 100 mesh to 20 mesh, and provides between 15 and 35 percent open area. U.S. patent application Ser. No. 518,113 filed Jan. 3, 1966, now U.S. Patent No. 3,428,493 constitutes a complete disclosure relating to the provision of a screen on the aluminum-lithium electrode.

Opposed to the lithium or lithium alloy anode is a cathode comprising a metal which takes up lithium from the electrolyte at a voltage which is more positive with respect to lithium. Examples of such metals are antimony, bismuth, and tellurium. Metals which are liquid at operating temperature can be used as such, or else, they can be disposed on a matrix, as in the case of the lithium surface electrolyte. If the particular metal remains solid at the operating temperature, it may be adapted for electrode function in the form of sheets, screens, or it may be deposited as a film on a supporting structure by means such as vapor deposition.

The maximum voltage for the unit cell described above is limited to the decomposition potential of the electrolyte, i.e., about 3.2 volts for lithium sulfate. To assemble an electrical energy storage device capable of delivering higher voltages, it would only be necessary to stack several unit cells in series, as is well known in the art.

A heating means is provided for the purpose of converting the electrolyte from a non-conducting to a conducting state. Once the storage device is started and is in normal operation, no external heat is necessary to maintain it in operating condition. Insulation is of course provided for the purpose of conserving heat. With a particular insulation, the electrolyte can be maintained in a molten condition for over sixty hours thus dispensing with the necessity of reheating the electrolyte to bring it up to the operating condition.

A conventional manner of assembling an electrical storage cell is to position anode and cathode in spaced, face-to-face relationship, and to dispose electrolyte between and in contact with the electrodes. There is a gamut of variations of the conventional cell. The electrolyte can be deposited as a thin film on the surface of one of the electrodes or it can be disposed on a matrix, as was already described. The electrodes can be used in the form of sheets, screens, plates, liquid pools, etc., or they can be deposited on a matrix or as a thin film on opposing faces of the electrolyte, assuming that the physical state of the electrode material is compatible with this function at the operating temperature. This disclosure is not intended to cover all possible variations nor is it intended to limit the instant invention to the specific embodiments disclosed.

EXAMPLE I

Referring to the drawing, a 40 percent porous Alundum® ($Al_2O_3$) crucible 20 containing about 25 to 30 grams of dehydrated lithium sulfate powder 21 was heated to 900° C., allowing the melted lithium sulfate to diffuse through the porous crucible. The crucible was 3¾ inches by 1⅜ inches O.D. with an ⅛ inch wall thickness. The excess lithium sulfate was poured out and the crucible was cooled and maintained at about 600° C., at which temperature, the lithium sulfate was already solidified in the pores of the crucible. The anode, constituting aluminum-lithium alloy powder 22, 16 percent by weight lithium and melting at about 600° C., was added to the crucible and a length of 16-gauge stainless steel wire 23 was immersed in the aluminum-lithium to act as a current collector. The aluminum-lithium alloy was maintained under an argon atmosphere.

About 20 grams of bismuth metal 24, functioning as the cathode, were then melted in a 200 mm. x 38 mm. Pyrex® test tube 25 and the crucible was immersed in it. A 16-gauge length of stainless steel wire current carrier 26 was immersed in the liquid bismuth to complete the cell. In this arrangement, the aluminum-lithium anode was physically separated from the bismuth cathode by the Alundum® crucible impregnated with lithium sulfate electrolyte, but there was ionic conduction through the continuous phase of the solid lithium sulfate held in the pores of the crucible.

The cell was charged at constant current of 20 ma. for one hour and then discharged at a constant current of 20 ma. On discharge, the voltage was 2.5 volts initially dropped to 2.4 volts after one hour, and to 2.0 volts in three and one-half hours. After several cycles of charging at a constant current of 20 ma. to 3.0 volts and then discharging at a constant current of 20 ma. to 1.5 volts, the efficiency was equivalent to 80 percent. During a typical discharge time of seven and one-half hours, the voltage dropped from 2.4 volts to 1.5 volts, and this decline was observed only in the last hour.

EXAMPLE II

An Alundum® crucible was impregnated with a molten mixture of lithium sulfate, lithium bromide and potassium bromide, as in Example I. The crucible was then cooled to about 600° C. An amount of lithium and indium metals was placed in the crucible and the crucible was disposed over a pool of liquid bismuth metal in a 200 mm. x 38 mm. Pyrex® test tube. Amount of the bismuth metal in the test tube was ⅓ inch³, or 50 grams. Stainless steel wires, serving as current collectors, were immersed in the molten bismuth and the indium-lithium.

The above cell was discharged at a constant current of 10 ma. It exhibited a flat discharge curve at about 1.6 volts over a period of about 40 hours. The capacity of the cathode was 1.93 watt-hours per inch³, or 1.2 amp-hours per inch³.

EXAMPLE III

A small porous fired clay crucible measuring 1½ inches in length, 5/16 inch in diameter and having an axial 1/16 inch bore, was impregnated with a dehydrated molten mixture of lithium sulfate and 30 weight percent lithium bromide. One gram of bismuth was placed in the crucible and the crucible was disposed over 2.1 grams of molten lithium-indium alloy in a Pyrex® test tube. The cell was maintained under argon atmosphere and at a temperature of about 600° C.

The cell was charged for half an hour at 3 volts and then discharged at 5 ma. The graph remained substantially flat at 1.4 volts for about 15 minutes. The cell was charged again at 3 volts and then discharged at 1 ma. After 1.6 hours, the voltage dropped below 1 volt. Capacity of the cathode was about 0.3 amp-hour per inch³.

EXAMPLE IV

Another cell was constructed in accordance with the procedure outlined in Example I, with the exception that the cathode consisted of 37.0 grams of antimony. 6.3 grams of aluminum-lithium powder, 16 weight percent lithium, constituted the anode. Since the melting point of antimony is 630° C., the antimony cathode remained solid at the operating temperature of 600° C. Antimony can function as a cathode at temperatures above its melting point, just as well as at temperatures below its melting point.

The cell was discharged immediately upon completion at a constant 10 ma. The potential was 1.9 volts initially and remained above 1.85 volts for the first five hours. The potential dropped to 1.4 volts overnight. After twenty-six hours of continuous operation, the potential was down to 1.0 volt.

EXAMPLE V

A tellurium cathode cell was constructed in accordance with the procedure outlined in Example I. About 6 grams of aluminum-lithium powder, 16 percent by weight lithium, were used for the anode and 1.5 grams of tellurium power constituted the cathode.

At a constant discharge current of 2 ma., the initial potential was 1.8 volt. This cell was discharged over the weekend at the constant current of 2 ma. After forty hours of continuous operation, the voltage dropped to 1.3 volts. After the forty-hour operation cycle, the temperature controller had failed, allowing the cell to cool to room temperature. On the basis of the forty hours of operation, the capacity was 5 amp.-hours per inch³, or 35 watt-hours per pound of cathode.

I claim:

1. A rechargeable electrical energy storage battery operable below the melting point of the electrolyte comprising an anode consisting of lithium and lithium alloys, a cathode selected from the group consisting of antimony, bismuth, and tellurium in opposed spaced relationship to said anode, and a solid electrolyte consisting essentially of lithium sulfate disposed between and in contact with said anode and said cathode.

2. Battery of claim 1 wherein said anode is selected from the group consisting of antimony-lithium, tin-lithium, and indium-lithium alloys.

3. Battery of claim 1 wherein said anode is aluminum-lithium alloy.

4. Battery of claim 3 wherein the composition of said aluminum-lithium alloy is about 5 to 30 mole percent lithium, the remainder being aluminum and incidental impurities.

5. Battery of claim 2 wherein said lithium sulfate electrolyte is disposed on a matrix.

References Cited

UNITED STATES PATENTS

| | | | |
|---|---|---|---|
| 2,937,219 | 5/1960 | Minnick et al. | 136—6 |
| 3,043,896 | 7/1962 | Herbert et al. | 136—6 |
| 3,160,531 | 12/1964 | Spindler | 136—120 |
| 3,236,694 | 2/1966 | Stenger et al. | 136—100 |
| 3,410,730 | 11/1968 | Rightmire et al. | 136—100 |
| 3,410,731 | 11/1968 | Rightmire et al. | 136—100 |
| 3,445,288 | 5/1969 | Buzzelli | 136—6 |

ALLEN B. CURTIS, Primary Examiner

A. SKAPARS, Assistant Examiner

U.S. Cl. X.R.

136—83, 153